Figure 1:
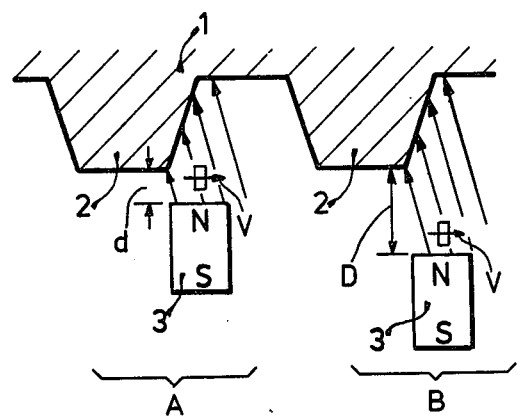

United States Patent [19]

Hauler et al.

[11] Patent Number: 4,481,469
[45] Date of Patent: Nov. 6, 1984

[54] ROTARY SPEED SENSOR WITH HALL GENERATOR RESPONDING TO TANGENTIAL COMPONENT OF MAGNETIC FIELD

[75] Inventors: Peter Hauler, Karlsruhe; Manfred Rothley, Kraichtal; Erich Zabler, Stutensee, all of Fed. Rep. of Germany

[73] Assignee: Robert Bosch GmbH, Stuttgart, Fed. Rep. of Germany

[21] Appl. No.: 377,026

[22] Filed: May 11, 1982

[30] Foreign Application Priority Data

Jun. 5, 1981 [DE] Fed. Rep. of Germany ....... 3122376

[51] Int. Cl.³ .......................... G01P 3/48; G01P 3/54
[52] U.S. Cl. ................................... 324/174; 324/169; 324/235
[58] Field of Search ............... 324/174, 173, 169, 208, 324/235

[56] References Cited

U.S. PATENT DOCUMENTS 4,207,519 6/1980 Zatsenpin et al. .................. 324/235
4,293,814 10/1981 Boyer .............................. 324/208 X

FOREIGN PATENT DOCUMENTS 2814606 10/1979 Fed. Rep. of Germany ...... 324/174
893986 4/1962 United Kingdom ..................... 174/
1261346 1/1972 United Kingdom ................ 324/235

OTHER PUBLICATIONS

Wroblewski, Hall Effect Impulse Emitter, IBM Technical Disclosure Bulletin, May 1972, p. 3810.

Primary Examiner—Stanley T. Krawczewicz
Attorney, Agent, or Firm—Frishauf, Holtz, Goodman & Woodward

[57] ABSTRACT

To determine the rotary speed of a toothed element (1), for example the starter gear of an internal combustion (IC) engine, or a toothed wheel coupled to a wheel of a vehicle for evaluation of the speed, and change in speed thereof, for use in a brake anti-block system, a magnetic field is generated, for example by a permanent magnet (3) which has both radial and tangential components with respect to the teeth (2) of the rotary element. A magnetic field dependent sensor (4) such as a Hall generator or a thin-film permalloy-type magneto-resistive sensor is positioned to respond to the tangential component of the magnetic field, to thereby eliminate shifts in the null or center line about which the field strength undulates as the disk rotates to permit ready evaluation of the output from the sensor by threshold circuitry.

18 Claims, 2 Drawing Figures

ROTARY SPEED SENSOR WITH HALL GENERATOR RESPONDING TO TANGENTIAL COMPONENT OF MAGNETIC FIELD

The present invention relates to a rotary speed sensor system, and more particularly to a system suitable to determine the speed of rotating elements in a vehicle, or engines driving a vehicle.

BACKGROUND

To determine the speed of rotating elements coupled to an engine, for example an internal combustion (IC) engine, in order to properly time ignition sparks thereof, it has been proposed to provide inductive sensors which are magnetically coupled with the teeth of the starter gear coupled to the internal combustion engine. Wheel anti-block systems or vehicle anti-skid systems also utilize sensors which determine the rotary speed of the wheels. It has been proposed to connect special toothed or geared wheels or gear rings to the wheels of automotive vehicles, and to couple the teeth with inductive sensors.

Systems of this kind operate satisfactorily if the relationship between the gear teeth and the inductive sensors remains constant. Improper or inaccurate mounting, for example off-center positioning of the inductive transducers or the gear wheels, jolts, shocks or vibration due to uneven road surfaces or the like impair the relationship sought by the designer. The uniformity of the air gap between the inductive pick-up and the teeth of the gear with which it is coupled thus may vary. This variation typically is periodic. In some pick-ups, particularly in the customary inductive pick-ups, the speed signal can thus be falsified or altered. It is possible to avoid such errors by using differential sensors which are so located with respect to the circumferential direction of the gear teeth that they are responsive to the difference in magnetic field between two adjacent points, rather than two absolute magnetic fields.

THE INVENTION

It is an object to provide a speed sensor system which is simple, requires only one inductive pick-up, and little network circuitry in combination therewith.

Briefly, a toothed rotary element is exposed to a magnetic field responsive sensor, such as a Hall generator; means are provided to generate an electrical field which includes both the rotary element and the sensor; these means may, for example, be a permanent magnet. The sensor, in accordance with the invention, is positioned relative to the field to respond to the tangential component of the magnetic field, rather than to the radial component, as in the prior art. The tangential component of the magnetic field varies symmetrically with respect to a fixed center or null line, and changes only in magnitude; radial components of the air gap, however, change not only the amplitude but also the relative center position of the undulations due to the teeth of the toothed element.

The arrangement has the advantage that it can be readily constructed and mounted, as well as assembled in automotive vehicles, without requiring extensive circuitry components or networks to compensate for out-of-round conditions or to eliminate stray signals which would mask the actual speed signal, for example due to shock, vibration, or the like, which may occur, particularly when the sensor is associated with a wheel of the vehicle. Use of a Hall sensor, which is simple and can readily be incorporated in the arrangement, has the advantage that its temperature characteristics is essentially even or flat; thus, a single element can be used which does not require external temperature compensation, in contrast to differential sensors which frequently utilize magnetic field responsive diode plate sensors or the like, and which have a steep temperature/response characteristic.

DRAWINGS

Figure 2:
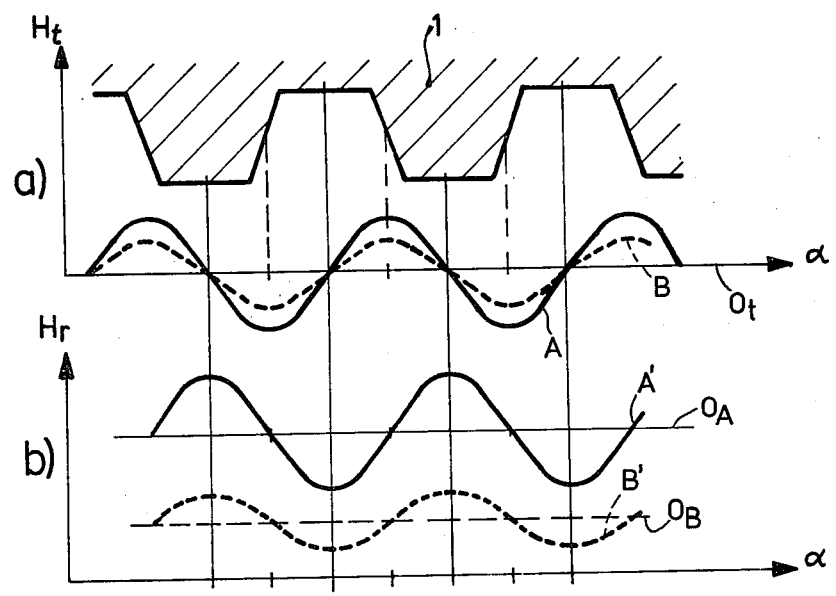

FIG. 1 is a schematic illustration showing the position of a Hall sensor to measure the tangential field derived from gear teeth; and FIG. 2 illustrates the course of the radial and tangential field strength components in dependence on angle of rotation at different air gaps.

A toothed disk 1, for example the starter gear coupled to the flywheel or the crankshaft of an internal combustion engine, is formed with projecting teeth 2. A permanent magnet 3 generates a magnetic field which changes in dependence on the air gap between the magnetic portions of the disk 1 which, for example, is made of steel. When a tooth 2 is exactly opposite the magnet 3, the field is intense; when a gap between teeth is opposite the magnet, the field is weak.

The sensor 4 is a magnetic field dependent sensor. The sensor is arranged to evaluate the tangential component of the field, rather than the radial component, as in the prior art. The field lines, in the relative position of gear 1 and magnet 3, are shown as arrows between the magnet and the gear. The evaluation of the field component by the sensor is indicated by the vector arrow through the sensor 4. As can readily be seen, the vector of the field changes as the disk 1 rotates past the sensor 4. The magnet 3 in the zone A is spaced from the periphery of the tooth 2 by a distance d and the sensor 4 spaced from the periphery by a distance ds. Let it be assumed that, due to shock, vibration, or an out-of-round condition, the relative distance between the next tooth 2, magnet 3 and the sensor 4, as shown in the region B, has increased to the distances D and DS. The field strengths in the zones A, B are then shown in FIG. 2, in which the narrow distance d is shown by the solid-line graphs, and the wider distance D is shown in the broken-line graphs. Graph a of FIG. 2 illustrates the tangential component of the field; graph b llustrates the radial component. The graphs clearly show that the tangential component of the field strength is fixed with respect to a center line about which the field strength undulates; it changes only in amplitude. The center line $O_t$ of the tangential component of the field strength is unvarying with respect to the solid-line curve A, which would be generated by teeth in the zone A, or the broken-line curve B which would be generated by teeth which have a wider spacing D from the sensor than those in the zone A. In contrast, and as shown in the graph b, the radial component of the field not only changes in its amplitude, but also in its center position. This is shown by graph A' for a narrow spacing d, and graph B' for a wider spacing D, which have relatively shifted center lines $O_A$ and $O_B$. Evaluation of the curves A', B' by a threshold circuit is extremely difficult, and requires extensive external circuitry and, under some conditions, is impossible. In contrast, the sensor 4, arranged and positioned to sense the tangential component of the field as indicated by the vector arrow through the sensor 4, senses a field which is weaker than the field of the radial component, but provides outputs which are unvarying with respect to a center amplitude or position of symmetry. The weaker field does not detract from evaluation thereof, however, since commercially available sensors now are so sensitive that weaker field strengths can readily be evaluated.

A preferred sensor 4 is a Hall sensor, which has a direction of magnetic sensitivity which is tangential with respect to the gear wheel 1, or which is, respectively, so positioned and arranged with respect thereto. Thus, the magnetically sensitive direction is transverse to the magnetization of the permanent magnet 3. GaAs-type Hall generators are particularly suitable, especially when combined with an integrated amplifier, since they have a wide range of operating temperatures with low temperature coefficient. Magneto-resistive thin-film sensors based on permalloy are also suitable, in which the direction of sensitivity to a magnetic field is in the plane of the thin film, that is, tangential with respect to the disk or wheel 1. The magnetic field generating means 3, typically permanent magnets, are positioned to be scanned by the teeth 2 of the wheel 1, and the sensors 4 which sense the field strength are so arranged that the tangential components of the field are evaluated, which is readily possible when the disk 1 is a gear in which the teeth have inclined edges, as shown in FIG. 1, i.e. edges inclined with respect to a radial line intersecting the axis of rotation of the gear. A typical gear is the starter gear of a internal combustion engine, or a pick-up wheel associated with a running wheel of a vehicle, to determine its speed and change in speed to permit evaluation of braking effort and hence control of deceleration/acceleration under varying vehicle operating conditions.

We claim:

1. Rotary speed sensor system having
   a toothed rotary element (1) of magnetic material, rotatable about an axis of rotation, in which the teeth have faces inclined with respect to radial lines intersecting the axis;
   a magnetic field responsive sensor (4);
   and means (3) to generate a magnetic field which includes both the teeth (2) of the rotary element and the sensor,
   wherein, in accordance with the invention,
   the sensor (4) is a field-dependent sensor and oriented and arranged relative to the field generated by the field generation means to respond to the tangential components of the magnetic field as the teeth (2) pass the sensor.

2. System according to claim 1, wherein the rotary element is a gear, and the teeth are formed by the gear teeth.

3. System according to claim 1, wherein the means (3) to generate the magnetic field comprises permanent magnet means (3) positioned to be scanned by the teeth (2) of the rotary element.

4. System according to claim 1, wherein the sensor (4) is a Hall sensor positioned and arranged to have a magnetic field dependent direction which is tangential with respect to the toothed rotary element (1).

5. System according to claim 1, wherein the sensor (4) is a magneto resistive thin-film sensor on permalloy basis, having a magnetic field sensitive direction in the plane of the thin film.

6. System according to claim 2, wherein the sensor (4) is a Hall sensor positioned and arranged to have a magnetic field dependent direction which is tangential with respect to the toothed rotary element (1).

7. System according to claim 3, wherein the sensor (4) is a Hall sensor positioned and arranged to have a magnetic field dependent direction which is tangential with respect to the toothed rotary element (1).

8. System according to claim 2, wherein the sensor (4) is a magneto resistive thin-film sensor on permalloy basis, having a magnetic field sensitive direction in the plane of the thin film.

9. System according to claim 3, wherein the sensor (4) is a magneto resistive thin-film sensor on permalloy basis, having a magnetic field sensitive direction in the plane of the thin film.

10. System according to claim 1, wherein the rotary element is the starter gear of an internal combustion engine.

11. System according to claim 10, wherein the means (3) to generate the magnetic field comprises permanent magnet means (3) positioned to be scanned by the teeth (2) of the rotary element.

12. System according to claim 10, wherein the sensor (4) is a Hall sensor positioned and arranged to have a magnetic field dependent direction which is tangential with respect to the toothed rotary element (1).

13. System according to claim 10, wherein the sensor (4) is a magneto resistive thin-film sensor on permalloy basis, having a magnetic field sensitive direction in the plane of the thin film.

14. System according to claim 11, wherein the means (3) to generate the magnetic field comprises permanent magnet means (3) positioned to be scanned by the teeth (2) of the rotary element.

15. System according to claim 11, wherein the sensor (4) is a Hall sensor positioned and arranged to have a magnetic field dependent direction which is tangential with respect to the toothed rotary element (1).

16. System according to claim 11, wherein the sensor (4) is a magneto resistive thin-film sensor on permalloy basis, having a magnetic field sensitive direction in the plane of the thin film.

17. System according to claim 14, wherein the sensor (4) is a Hall sensor positioned and arranged to have a magnetic field dependent direction which is tangential with respect to the toothed rotary element (1).

18. System according to claim 14, wherein the sensor (4) is a magneto resistive thin-film sensor on permalloy basis, having a magnetic field sensitive direction in the plane of the thin film.

* * * * *